United States Patent [19]

Kalkbrenner et al.

[11] Patent Number: 5,174,947
[45] Date of Patent: Dec. 29, 1992

[54] NUCLEAR FUEL PELLET TURNING APPARATUS AND METHOD

[75] Inventors: Ralph W. Kalkbrenner, Hempfield Township, Westmoreland County; Ralph W. Kugler, Mt. Lebanon Township, Allegheny County, both of Pa.; Roger J. Wiggins, Columbia, S.C.

[73] Assignee: Westinghouse Electric Corporation, Pittsburgh, Pa.

[21] Appl. No.: 628,121

[22] Filed: Dec. 14, 1990

[51] Int. Cl.⁵ ............................................. G21C 17/00
[52] U.S. Cl. ......................................... 376/245; 376/261
[58] Field of Search ............... 376/245, 261; 209/538, 209/542

[56] References Cited

U.S. PATENT DOCUMENTS

| | | | |
|---|---|---|---|
| 3,221,152 | 11/1965 | Jones | 235/151.13 |
| 3,897,673 | 8/1975 | Kee et al. | 53/61 |
| 4,098,408 | 7/1978 | Miller, Jr. et al. | 209/82 |
| 4,103,776 | 8/1978 | Taniguchi et al. | 209/73 |
| 4,349,112 | 9/1982 | Wilks et al. | 209/538 |
| 4,410,278 | 10/1983 | Makihira et al. | 356/445 |
| 4,687,605 | 8/1987 | Cellier et al. | 264/0.5 |
| 4,696,784 | 9/1987 | Tolino et al. | 376/245 |
| 4,748,798 | 6/1988 | Udaka et al. | 53/504 |
| 4,842,808 | 6/1989 | Rieben et al. | 376/261 |

Primary Examiner—Donald P. Walsh
Assistant Examiner—Meena Chelliah

[57] ABSTRACT

A pellet turning apparatus for facilitating surface inspection of nuclear fuel pellets includes a pellet turner assembly and a pellet supply tray interface assembly. The pellet turner assembly includes a pellet turner deck and a swivel mechanism supporting the deck. The pellet turner deck is composed of a base frame mounted on the swivel mechanism, a plurality of elongated laterally-spaced pellet channel-defining members extending between and mounted at the opposite ends of the frame, a pellet rolling plate supported on the frame below the pellet channel-defining members, and an actuating mechanism coupled to the pellet rolling plate for moving the plate in oscillatory direction substantially perpendicular to the pellet channels for producing in situ turning of the pellets. The interface assembly is mounted to a pellet loading end of the pellet turner deck. The interface assembly is operable for disposing a pellet transfer end of a pellet supply tray at a desired elevation relative to the pellet loading end of the pellet turner deck. The interface assembly includes a tray elevating mechanism having engaging elements for coupling to the transfer end of the pellet supply tray, and an actuating cam mechanism coupled for moving the elevating mechanism to raise or lower the engaging elements and thereby raise or lower the transfer end of the supply tray respectively above or below the loading end of the pellet turner deck.

22 Claims, 14 Drawing Sheets

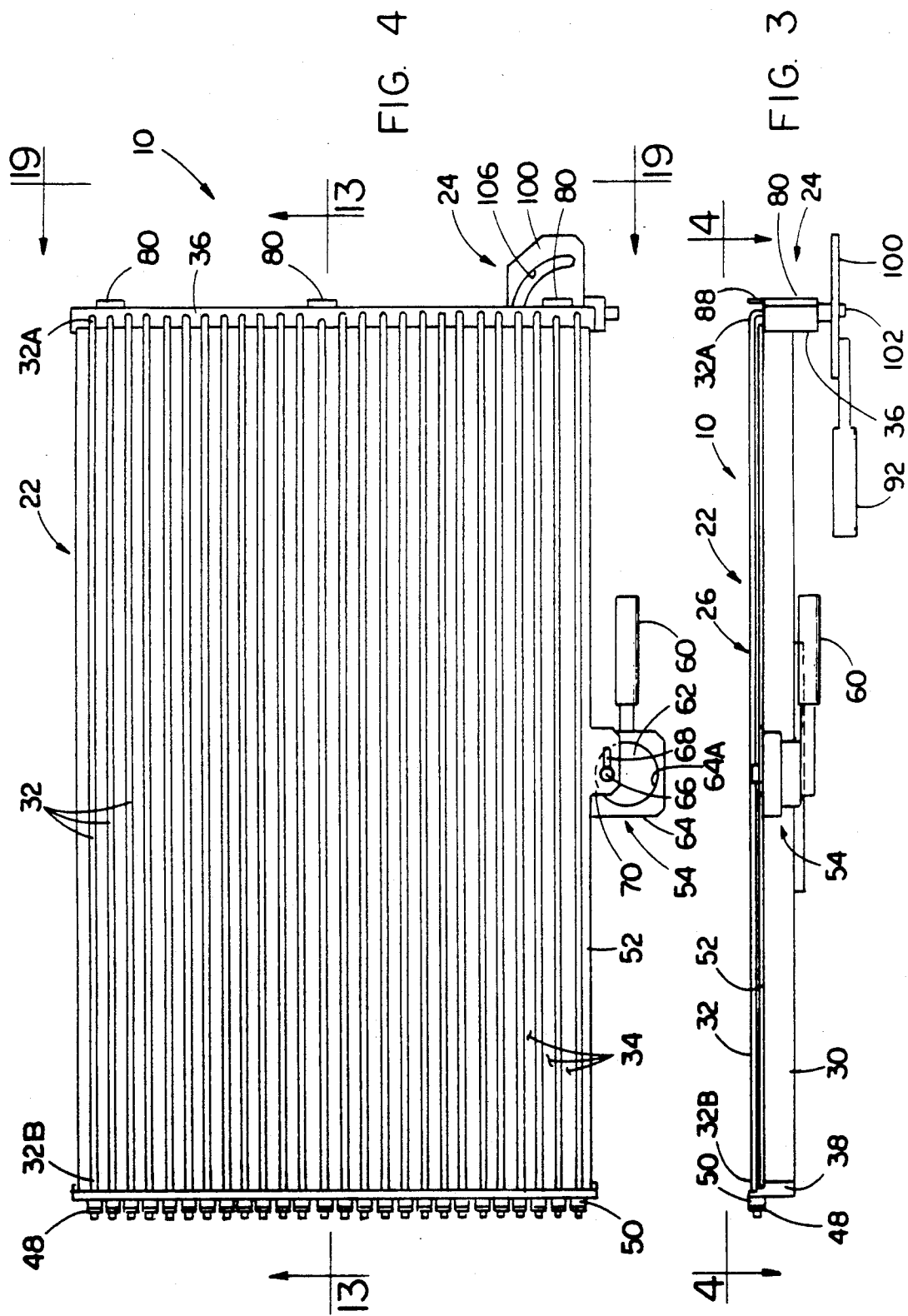

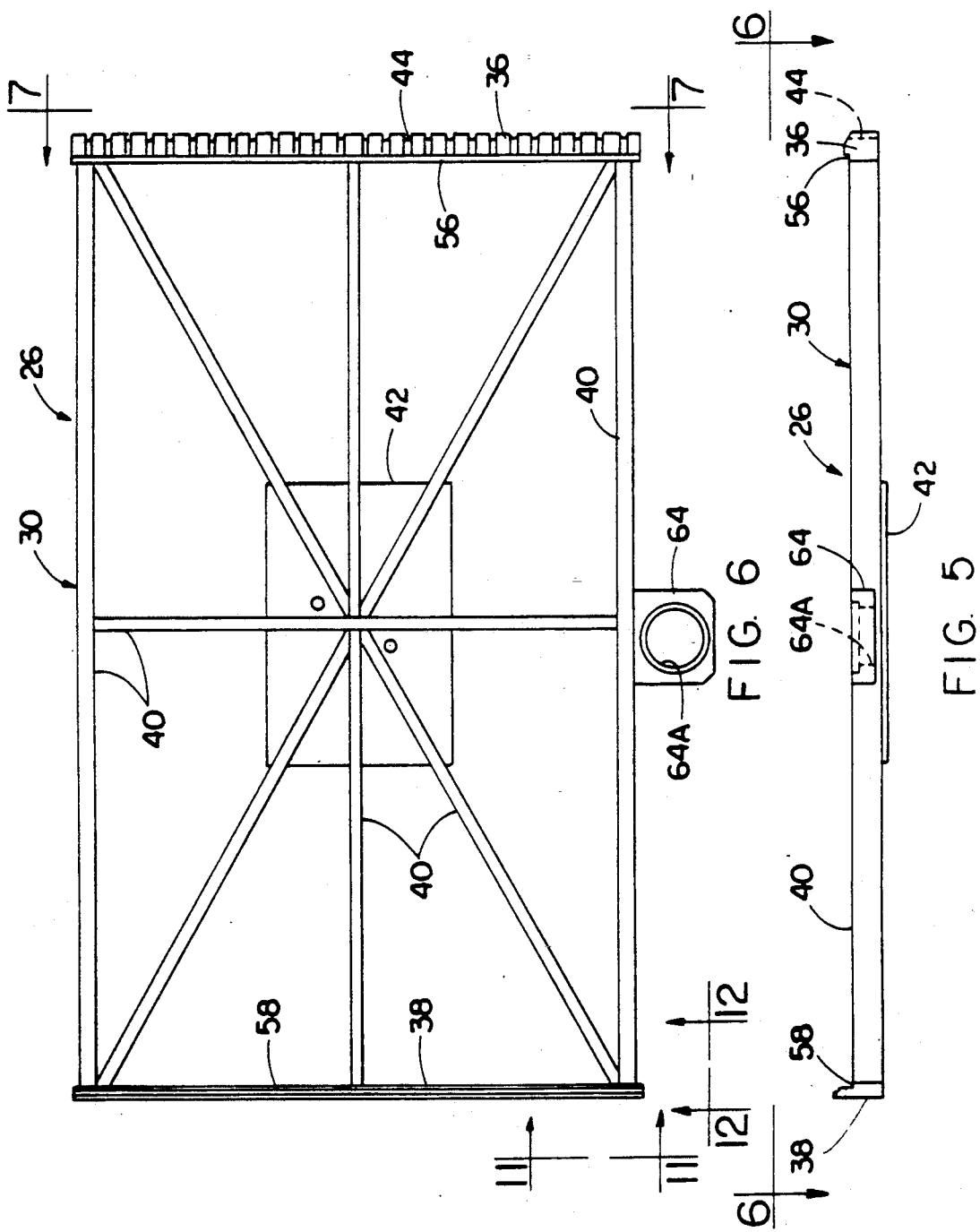

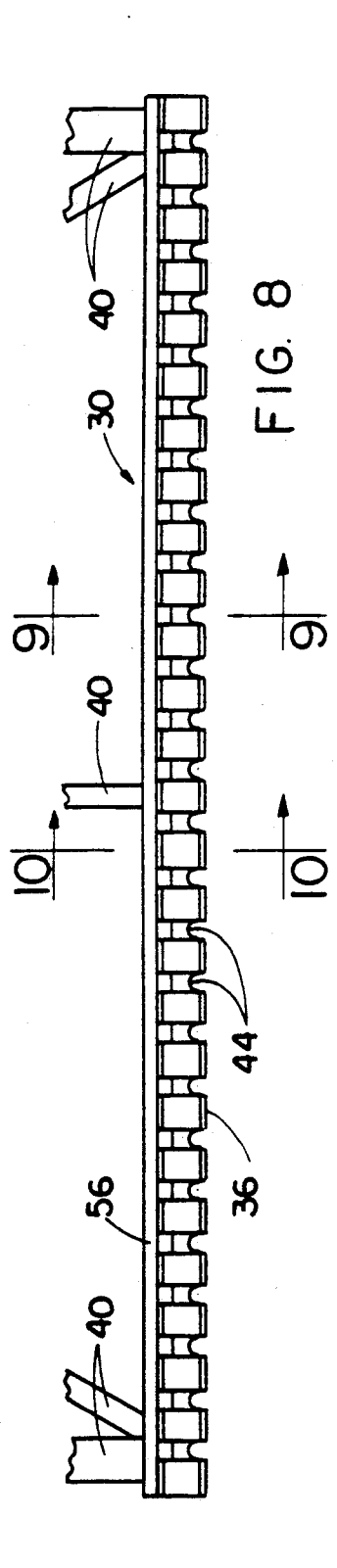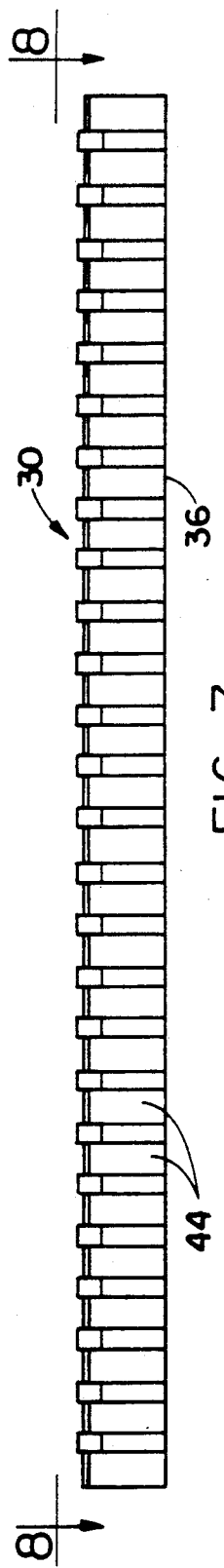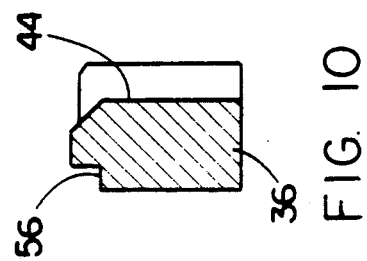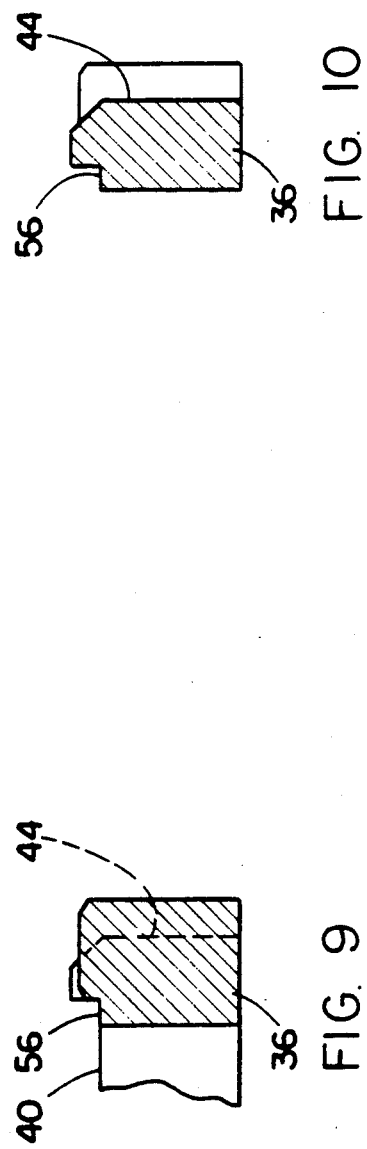

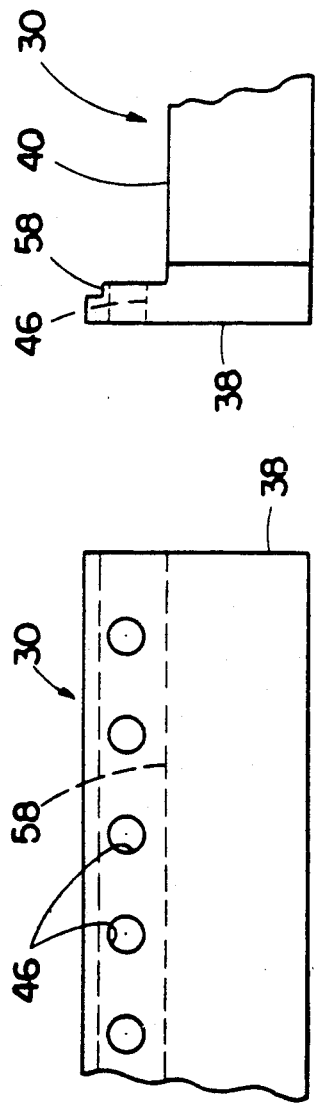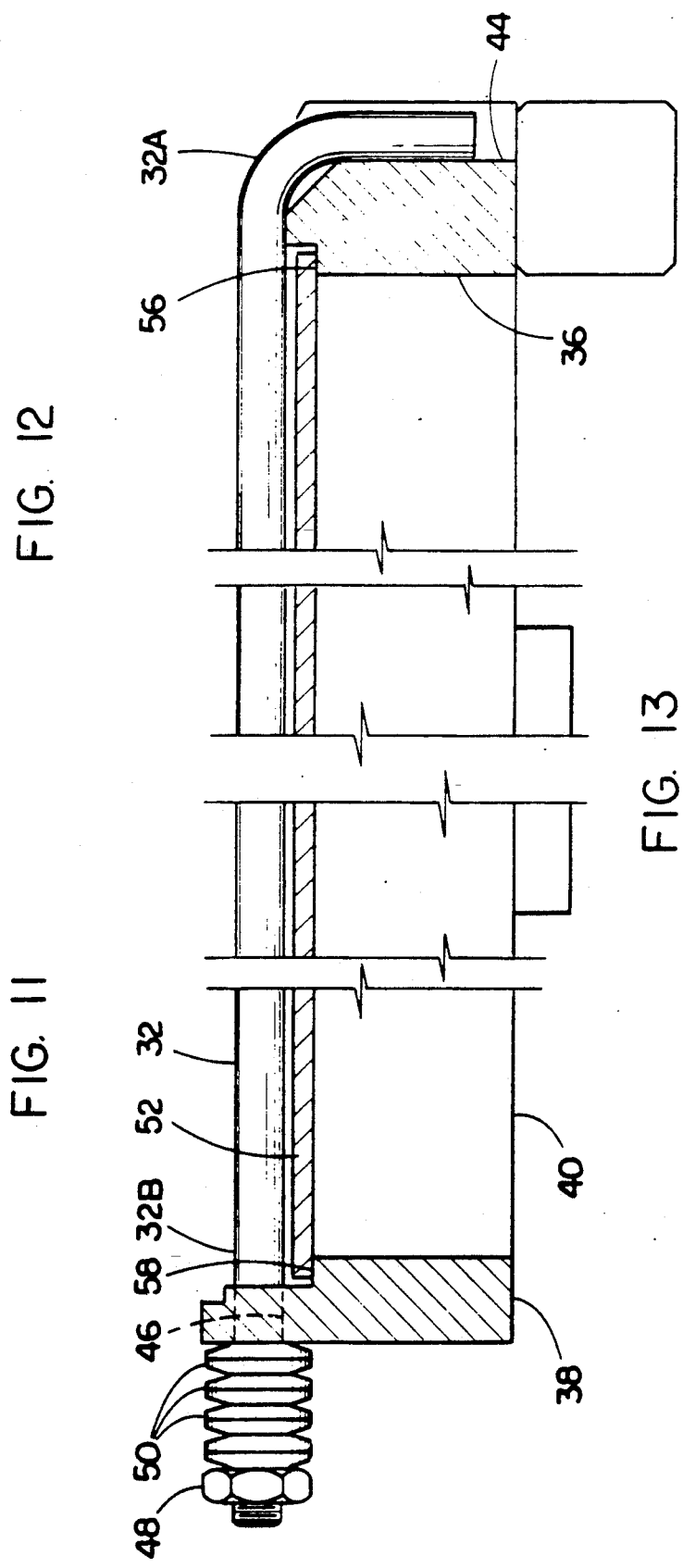

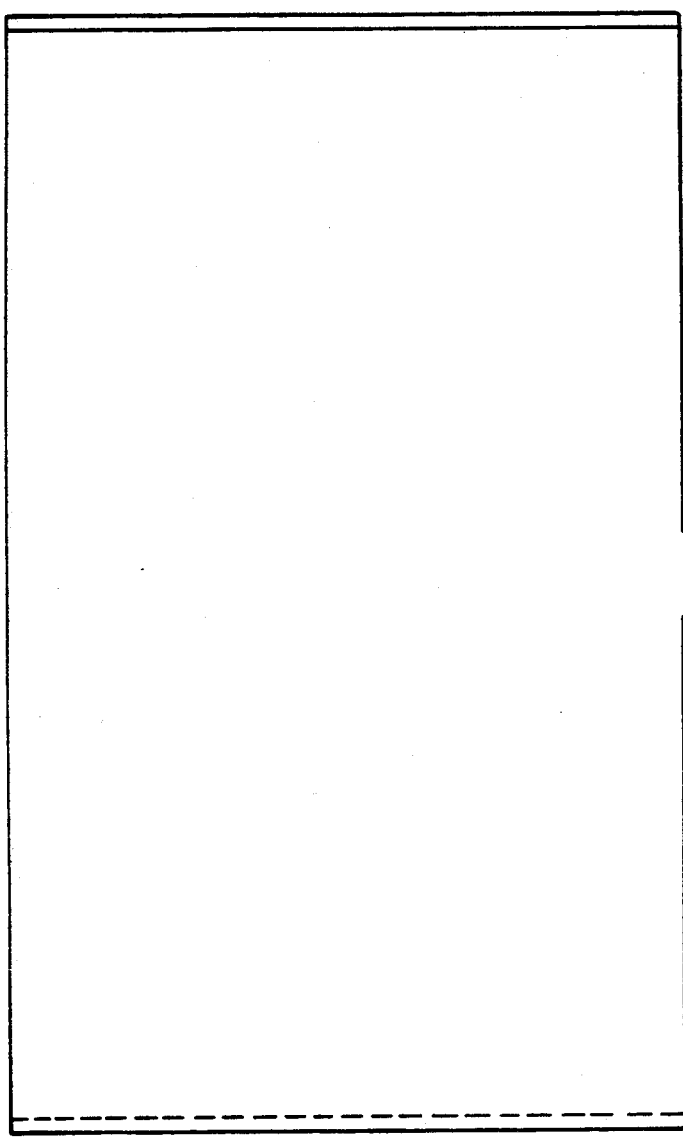
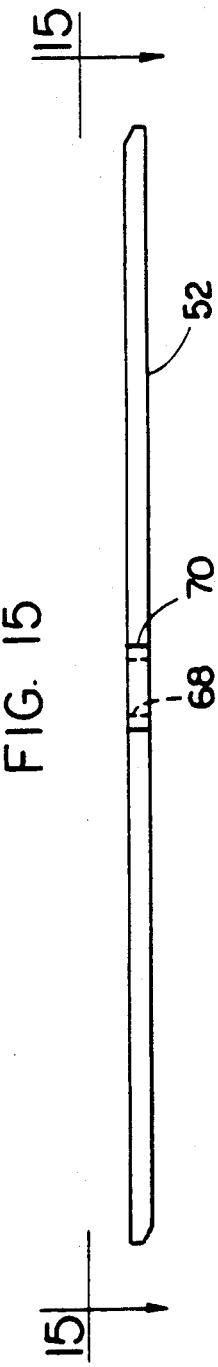
FIG. 15
FIG. 14

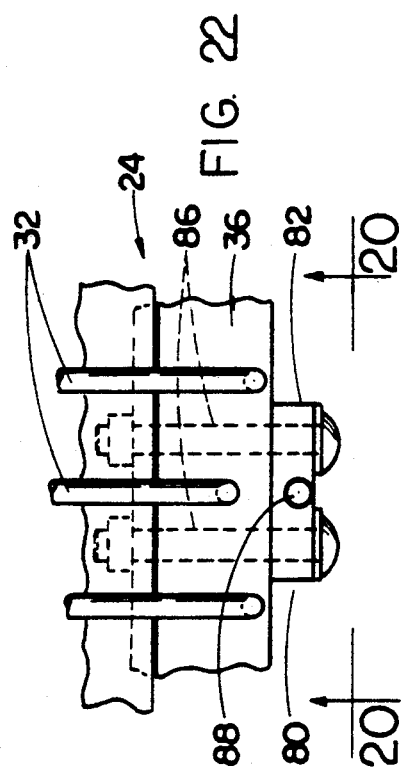
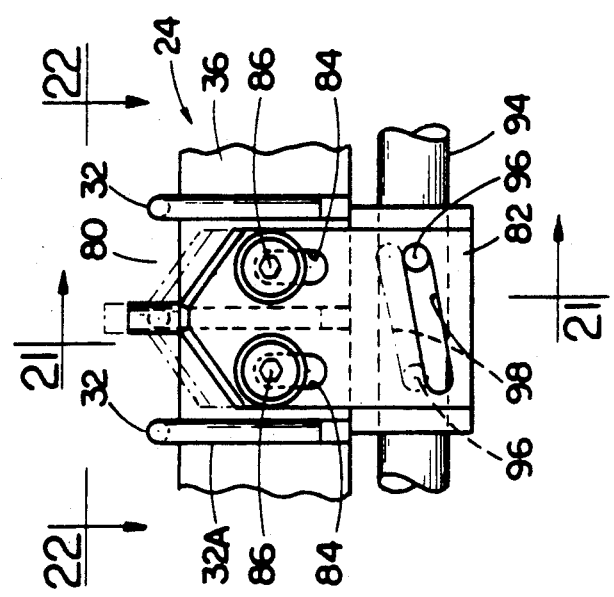
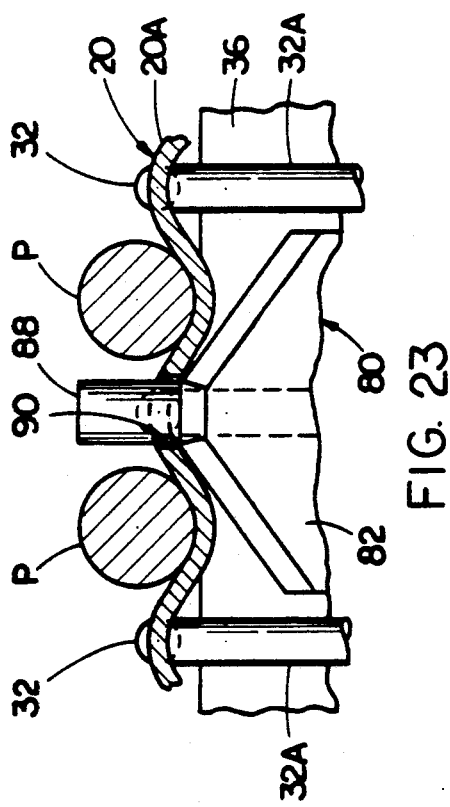
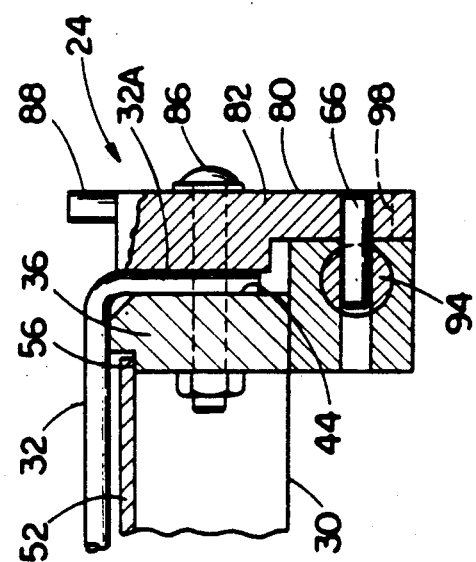

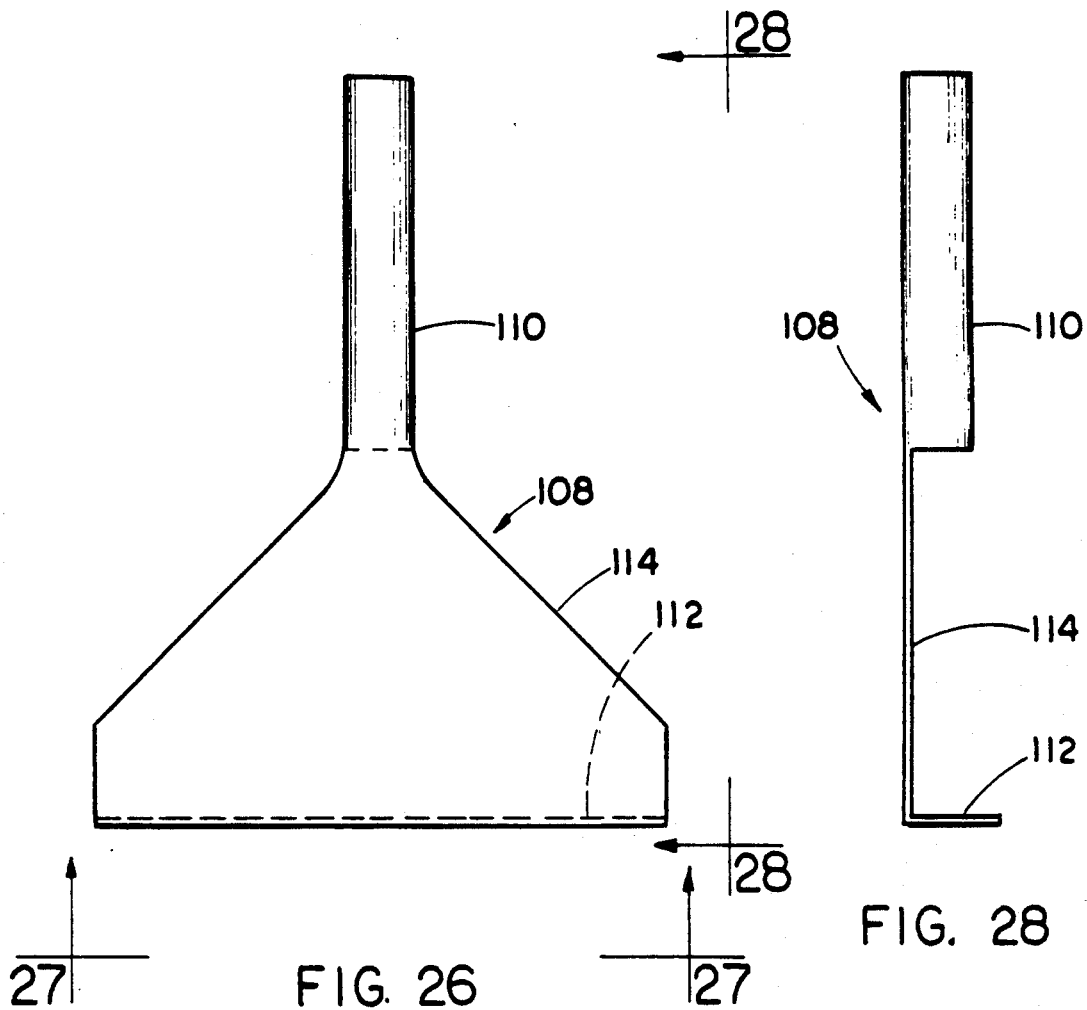
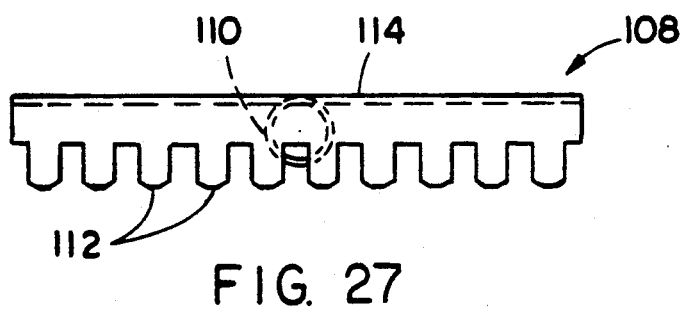

NUCLEAR FUEL PELLET TURNING APPARATUS AND METHOD

BACKGROUND OF THE INVENTION

1. Field of the Invention

The present invention relates generally to nuclear fuel pellet inspection and, more particularly, is concerned with a nuclear fuel pellet turning apparatus and method for facilitating surface inspection of pellets.

2. Description of the Prior Art

In a typical nuclear reactor, the reactor core includes a large number of elongated fuel assemblies. Conventional designs of these fuel assemblies include top and bottom nozzles with a plurality of elongated transversely spaced guide thimbles extending longitudinally between and connected at opposite ends to the nozzles and a plurality of transverse support grids axially spaced along the guide thimbles. Also, each fuel assembly is composed of a multiplicity of elongated fuel elements or rods transversely spaced apart from one another and from the guide thimbles and supported by the transverse grids between the top and bottom nozzles.

The fuel rods each contain fissile material in the form of a plurality of generally cylindrical nuclear fuel pellets maintained in a row or stack thereof in the rod. The fuel rods are grouped together in an array which is organized so as to provide a neutron flux in the core sufficient to support a high rate of nuclear fission and thus the release of a large amount of energy in the form of heat. A liquid, coolant is pumped upwardly through the core in order to extract some of the heat generated in the core for the production of useful work.

During the manufacture of the fuel rods for the fuel assemblies, visual inspection of the nuclear fuel pellets is a key operation for the production of quality fuel assemblies. The entire cylindrical surface of the pellet is checked for dimensional quality, cracks and other defects, including chipped edges. The practice heretofore for inspecting pellet surfaces has been to provide side-by-side rows of aligned pellets on a first pellet support tray. After an operator visually inspects the exposed portions of the external cylindrical surfaces of the pellets, a second empty pellet support tray is placed upside down over the pellets loaded on the first support tray. With the two trays held together, they are manually inverted so as to transfer the pellets en masse from the first support tray to the second support tray. The operator again visually inspects the newly-exposed portions of the external cylindrical surfaces of the pellets to complete the inspection of the pellets.

This conventional practice has several drawbacks. First, the weight of the pellets and the two trays is oftentimes excessive and unacceptable from the standpoint of the capabilities of the typical operators. Second, the trays are often warped slightly, which could permit pellets to fall out during the turn-over or inverting action. Third, and more importantly, the portion of the cylindrical surface of the pellet than occurs at the horizontal midplane of the pellet cannot be effectively inspected due to the geometry of the pellet array and the overhead position of the light source. This questionable region amounts to approximately ten percent of the cylindrical surface of the pellet.

Consequently, a need exists for improvement of the manner in which nuclear fuel pellet surface, inspection is carried out so as to eliminate the problems associated with the prior art method and still further improve the quality of fuel fuel pellet inspection.

SUMMARY OF THE INVENTION

The present invention provides a pellet turning apparatus and method designed to satisfy the aforementioned needs. The pellet turning apparatus and method of the present invention improves the quality of inspection by reducing the amount of effort required by the operator and by enabling the ability of the operator to see the entire surface of the pellet. The requirement to place an empty tray over the loaded tray and to invert the two trays and pellets is eliminated, relieving the operator of a difficult and heavy task. A substantially less cumbersome and time-consuming way is introduced for transferring the pellets to and from the inspection tray. Also, rolling or turning the pellets in situ, or while remaining in their original place, is introduced, permitting total circumferential sighting and inspection of the external surfaces of the pellets.

Accordingly, the present invention is directed to a pellet turning apparatus for facilitating surface inspection of nuclear fuel pellets. The pellet turning apparatus includes: (a) a pellet turner assembly; and (b) a pellet supply tray interface assembly. The pellet turner assembly includes a pellet turner deck and a swivel mechanism for supporting the deck on a stand. The pellet turning apparatus also includes a pellet rake for use by an operator in loading and unloading pellets onto and from the pellet turner deck.

More particularly, the pellet turner deck is composed of a frame mounted on the swivel mechanism, a plurality of elongated laterally-spaced pellet channel-defining members extending between opposite ends of the frame, and means for supporting the pellet channel-defining members at their opposite ends in spaced relation above the base frame. The pellet turner deck also includes a pellet rolling plate supported on the frame below the pellet channel-defining members for supporting pellets in rows between the channel-defining members and an actuating mechanism coupled to the pellet rolling plate. The actuating mechanism is operable to cause oscillatory movement of the plate relative to the channel-defining members for producing in situ simultaneous turning of the pellets within the channels to permit visual inspection of the entire circumferential surfaces of the pellets. Also, the swivel mechanism supporting the pellet turner deck, in turn, is operable for swiveling and tilting the pellet turner deck to thereby permit an operator to easily visually inspect the opposite edges of the pellets for the presence of cracks and chips.

Further, the pellet supply tray interface assembly is mounted at a pellet loading end of the pellet turner deck. The interface assembly is operable for disposing a pellet transfer end of the pellet supply tray at a desired elevation relative to the pellet loading end of the pellet turner deck. The interface assembly includes a tray elevating mechanism mounted to the pellet loading end of the pellet turner deck. The tray elevating mechanism has at least one and preferably a plurality of engaging elements for coupling with the pellet transfer end of the pellet supply tray. An actuating cam mechanism is coupled to the tray elevating mechanism for moving the elevating mechanism to raise or lower the engaging elements of the elevating mechanism and thereby raise or lower the pellet transfer end of the supply tray respectively above or below the pellet loading end of the pellet turner deck.

The present invention is also directed to a pellet turning method for facilitating surface inspection of nuclear fuel pellets. The pellet turning method includes the steps of: (a) supporting a plurality of nuclear fuel pellets in rows in laterally-spaced channels extending between opposite ends of a pellet turner deck; and (b) producing simultaneous turning of the pellets in situ within the channels to permit visual inspection of the entire circumferential surfaces of the pellets. The method also includes the steps of producing simultaneous tilting of the pellet deck to permit visual inspection of the opposite edges of the pellets for the presence of cracks and chips, and raking pellets along the channels for loading and unloading the pellets to and from the pellet turning deck.

More particularly, the turning of the pellets is produced by moving in oscillatory fashion and in a direction extending in transverse relation to the channels a flat plate located below the channels and supporting the pellets in rows within the channels. For facilitating transfer of pellets between the supply tray and the pellet turner deck, a pellet transfer end of a pellet supply tray is either raised or lowered to a desired elevation above or below a pellet loading end of the pellet turner deck.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 3 is an enlarged side elevational view of a pellet turner assembly of the pellet turning apparatus of FIG. 1.

FIG. 4 is a top plan view of the pellet turner assembly as seen along line 4—4 of FIG. 3.

FIG. 5 is a side elevational view or a frame of the pellet turner assembly of FIG. 4.

FIG. 6 is a top plan view of the frame as seen along line 6—6 of FIG. 5.

FIG. 7 is an enlarged end elevational view of a support bar of the pellet turner assembly frame as seen along line 7—7 of FIG. 6.

FIG. 8 is an enlarged top plan view of the support bar as seen along line 8—8 of FIG. 7.

FIG. 9 is an enlarged cross-sectional view of the support bar taken along line 9—9 of FIG. 8.

FIG. 10 is another enlarged cross-sectional view of the support bar taken along line 10—10 of FIG. 8.

FIG. 11 is an enlarged fragmentary end elevational view of a base bar of the pellet turner assembly frame as seen along line 11—11 of FIG. 6.

FIG. 12 is an enlarged fragmentary side elevational view of the base bar as seen along line 12—12 of FIG. 6.

FIG. 13 is an enlarged foreshortened longitudinal sectional view of the pellet turner assembly taken along line 13—13 of FIG. 4.

FIG. 14 is a side elevational view of a pellet rolling plate of the pellet turner assembly of FIG. 4.

FIG. 15 is a top plan view of the pellet rolling plate as seen along line 15—15 of FIG. 14.

FIG. 20 is an enlarged fragmentary view of the interface assembly of FIG. 19 illustrating a portion of a tray elevating mechanism of the interface assembly.

FIG. 21 is a cross-sectional view of the tray elevating mechanism taken along line 21—21 of FIG. 20.

FIG. 22 is a top plan view of the tray elevating mechanism as seen along lines 22—22 of FIGS. 19 and 20.

FIG. 23 is an enlarged fragmentary view of the tray elevating mechanism of FIG. 20 showing the pellet supply tray supporting pellets thereon and installed on an engaging element of the elevating mechanism.

FIG. 26 is a top plan view of a pellet rake incorporated by the pellet turning apparatus of FIG. 1.

FIG. 27 is a front end elevational view of the rake as seen along line 27—27 of FIG. 26.

FIG. 28 is a side elevational view of the rake as seen along line 28—28 of FIG. 26.

DETAILED DESCRIPTION OF THE INVENTION

Figure 1:
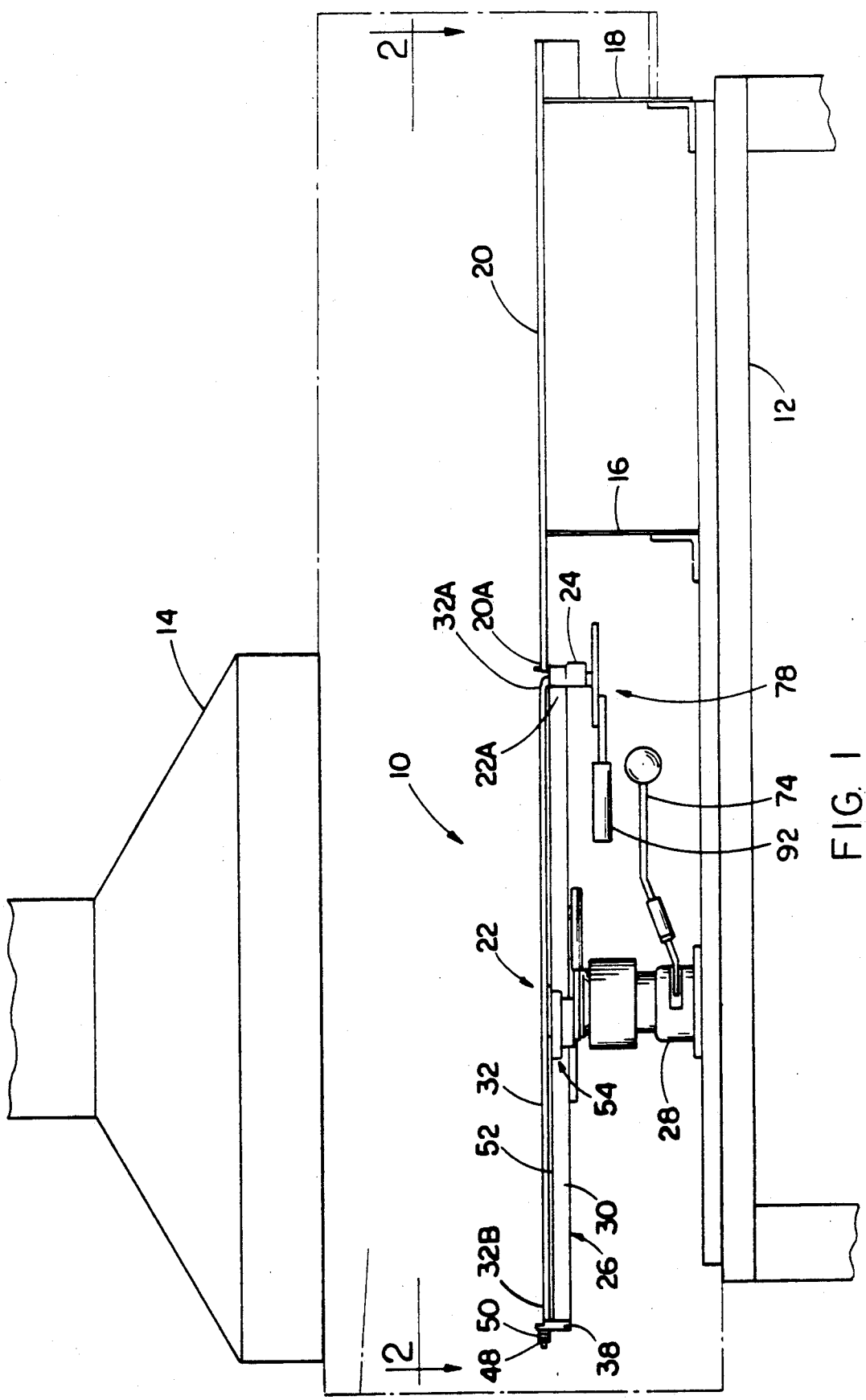
FIG. 1 is a side elevational view of a pellet turning apparatus of the present invention disposed under an exhaust hood.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

Figure 2:
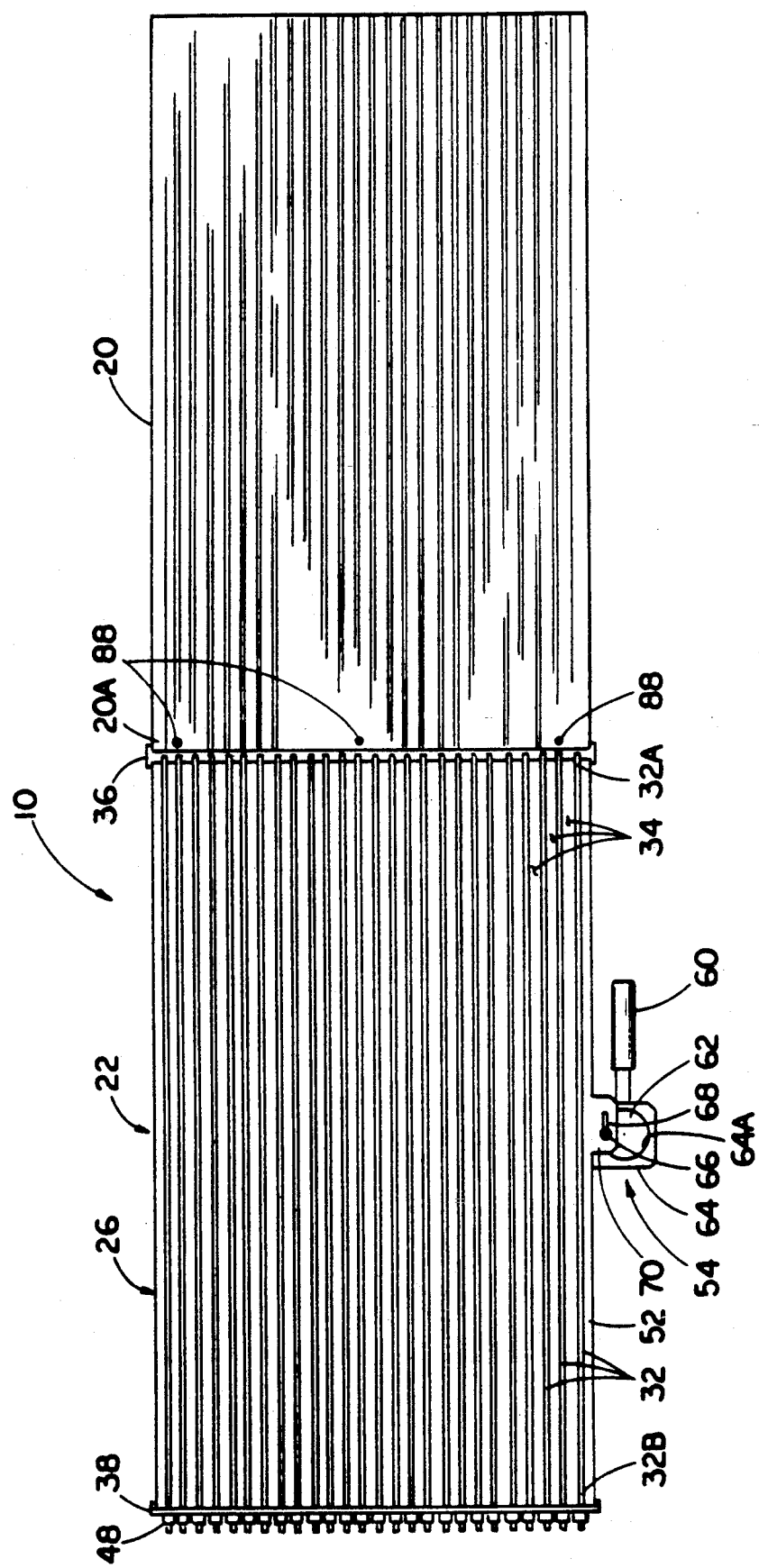
FIG. 2 is a top plan view of the pellet turning apparatus as seen along line 2—2 of FIG. 1.
Figure 18:
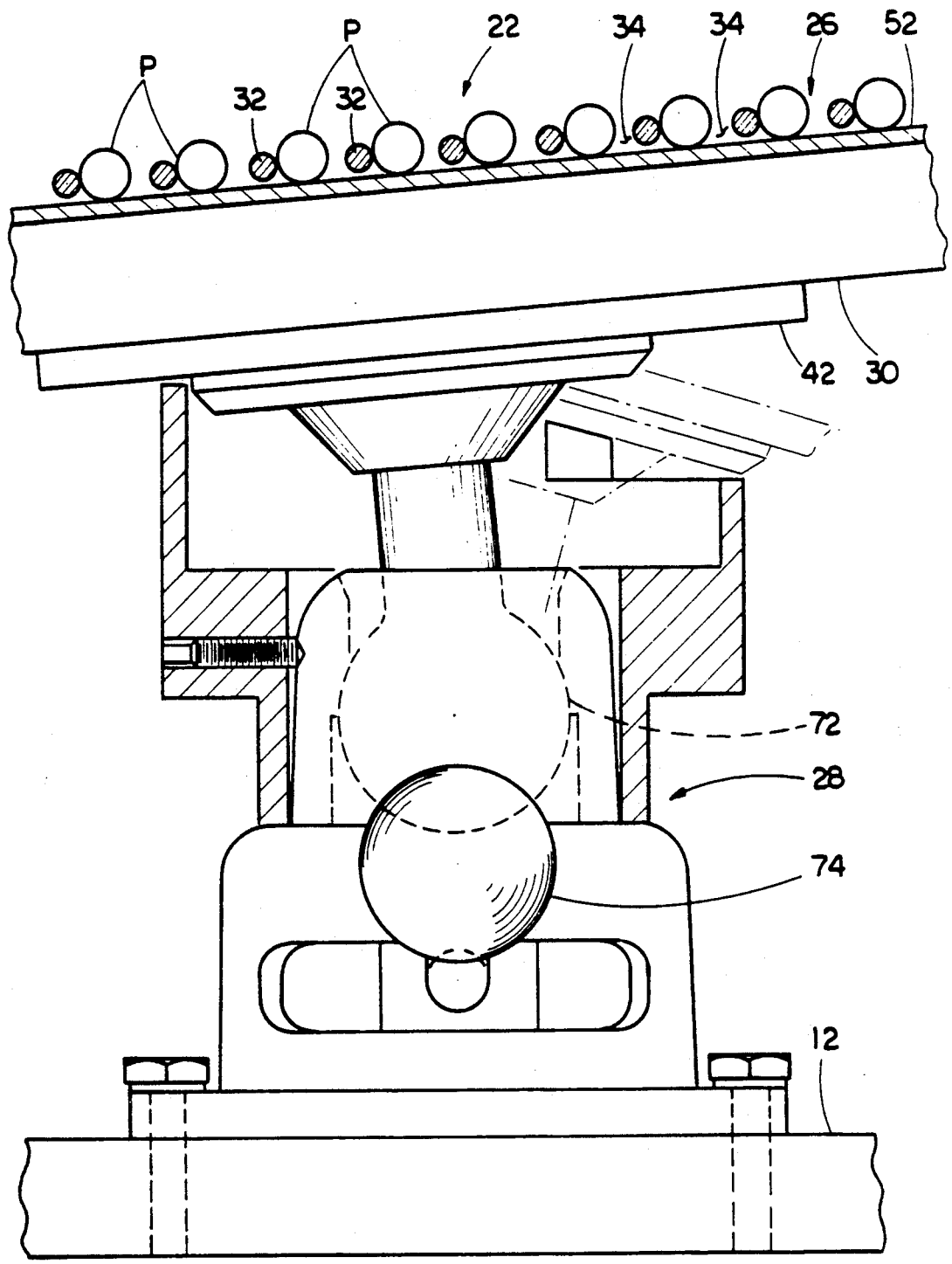
FIG. 18 is an enlarged fragmentary elevational view, partly in section, of a swivel mechanism of the pellet turner assembly of FIG. 1.

Referring now to the drawings, and particularly to FIGS. 1 and 2, there is illustrated a nuclear fuel pellet turning apparatus of the present invention, being generally designated 10. The pellet turning apparatus 10 is used by an operator for handling a plurality of nuclear fuel pellets P at a time and facilitating surface inspection of the pellets P (FIGS. 18 and 23). The pellet turning apparatus 10 is disposed upon a work table 12 and under an exhaust hood 14 contained in an enclosed isolation chamber. A pair of spaced upright brackets 16, 18 are mounted on the work table 12 adjacent the pellet turning apparatus 10 for receiving and supporting a pellet supply tray 20 next to the pellet turning apparatus 10.

In its basic components, the pellet turning apparatus 10 includes a pellet turner assembly 22 cable of supporting the pellets P and an interface assembly 24 coupled to the pellet turner assembly 22. The pellet turner assembly 22 can be operated to accomplish two functions. First, the pellet turner assembly 22 is operable for producing simultaneous turning of the pellets P in situ (i.e., rolling in place) to permit visual inspection of the entire circumferential surfaces of the pellets. Second, the pellet turner assembly 22 is also operable for producing simultaneous tilting of the pellets P to permit visual inspection of the opposite edges of the pellets. The interface assembly 24 is coupled to a pellet loading end 22A of the pellet turner assembly 22 and is operable for disposing a pellet transfer end 20A of the pellet supply tray 20 at a desired elevation above or below the loading end 22A of the pellet turner assembly 22 to facilitate transfer of uninspected pellets from the pellet supply tray 20 to the pellet turner assembly 22 and of inspected pellets from the pellet turner assembly 22 to the pellet supply tray 20.

Referring to FIGS. 3-17, there is illustrated the pellet turner assembly 22 which includes a pellet turner deck 26 and a swivel mechanism 28. The pellet turner deck 26 supports pellets P in side-by-side spaced rows. The swivel mechanism 28 supports the pellet turner deck 26 and, in turn, is operable for swiveling and tilting the pellet turner deck 26 to allow simultaneous tilting of the pellets P and thereby permit an operator to easily visually inspect the opposite edges of the pellets for the presence of cracks and chips.

More particularly, referring to FIGS. 3-13, the pellet turner deck 26 includes a base frame 30 mounted on the swivel mechanism 28, a plurality of elongated laterally-spaced rod-like members 32 extending between opposite ends of the base frame 30 and defining channels 34 between the members for receiving and arranging the pellets P in rows. The width of the channels 34 is greater than the diameter of the pellets P, as can be seen in FIG. 18, such that the pellets P are not supported upon the rod-like members 32. Also, means are provided on the base frame 30 for supporting the elongated rod-like members 32 at their opposite ends in spaced relation above the base frame 30. Such means takes the configuration of a support bar 36 attached on the right end and a base bar 38 attached on the left end of a network 40 of interconnecting frame members and a flat plate 42 which also make up the base frame 30. The flat plate 42 rigidly mounts the network 40 and, in turn, is attached on the upper end of the swivel mechanism 28. The swivel mechanism 28 is setup to normally support the deck 26 slightly off horizontal, for example, preferably at a five degrees incline perpendicular to the rod-like members 32.

As best seen in FIGS. 8-13, the right ends 32A of the rod-like members 32 are bent ninety degrees and extend within vertical grooves 44 defined in laterally-spaced relation on the exterior of the support bar 36. The left ends 32B of the rod-like members 32 are received through holes 46 in the base bar 38 and biased by fasteners 48 and spring washers 50 to retain the right ends 32A in the grooves 44.

As shown more specifically in FIGS. 3, 4 and 13-15, the pellet turner deck 26 also includes a pellet rolling plate 52 and an actuating mechanism 54 coupled to the plate 52. The pellet rolling plate 52 has a flat configuration and is movably supported on opposite ledges 56, 58 defined on the interior sides of the support and base bars 36, 38 of the base frame 30 below the pellet channel-defining rod-like members 32. In such position underlying the rod-like members 32, the rolling plate 52 supports the pellets P (FIG. 18) between the pellet channel-defining members 32. The slightly inclined mounting of the deck 26 ensures that all the pellets P are disposed against the rod-like members 32 on the same side of the channels 34. Such relationship enhances the visual inspection carried out by the operator.

Figure 16:
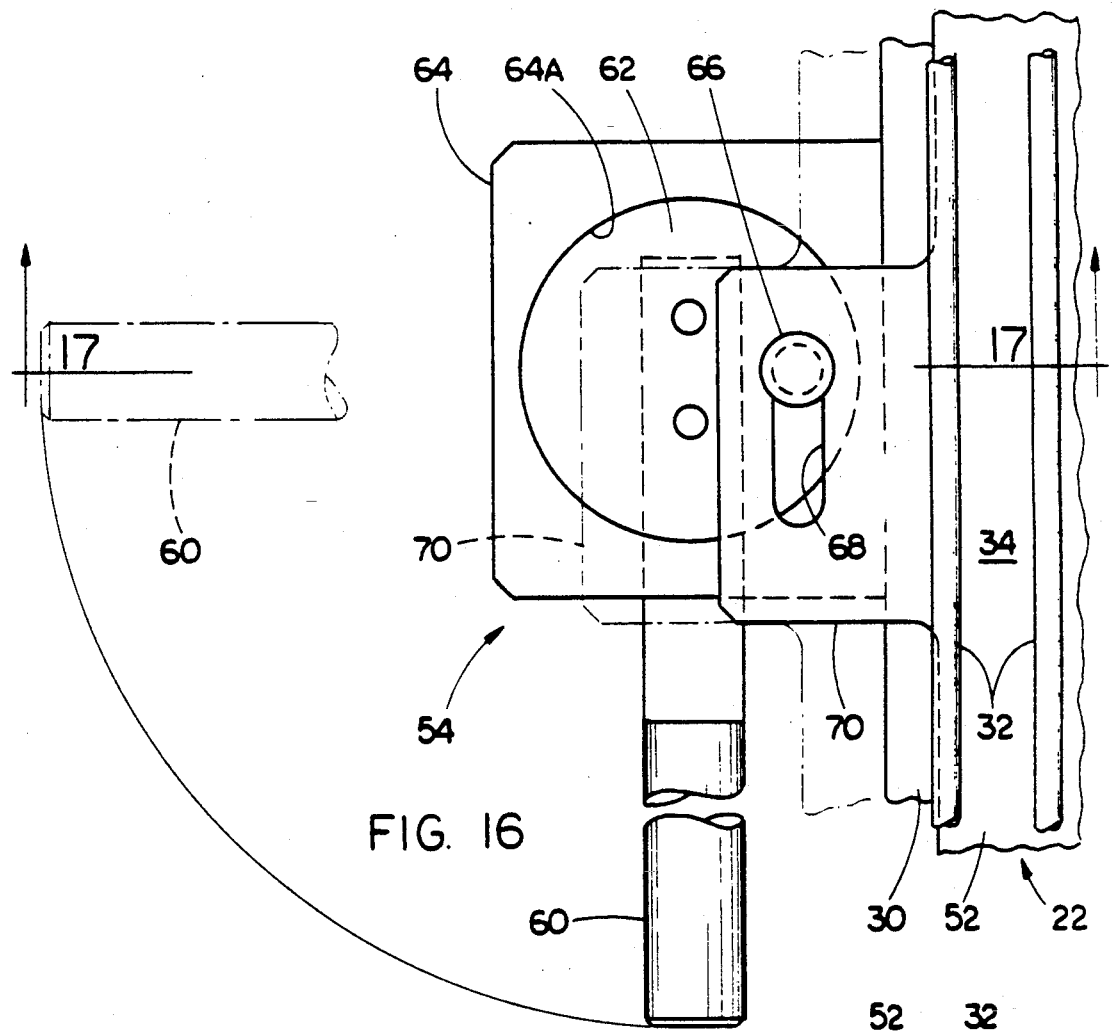
FIG. 16 is an enlarged top plan view of an actuating mechanism of the pellet turner assembly of FIG. 4 coupled to the pellet rolling plate.
Figure 17:
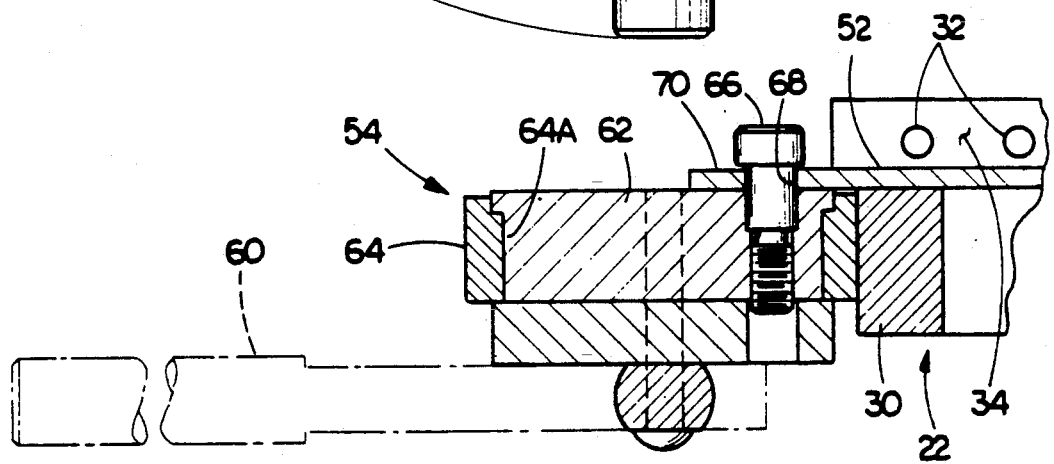
FIG. 17 is a cross-sectional view of the actuating mechanism taken along line 17—17 of FIG. 16.

The actuating mechanism 54 is mounted on the base frame 30 and coupled to the pellet rolling plate 52. The actuating mechanism 54 is operable to produce oscillatory movement of the plate 52 in a direction generally perpendicular to the channel-defining members 32 for producing rolling or turning of the pellets P in situ on the plate and the channel-defining rod-like members 32. More, particularly, as best seen in FIGS. 16 and 17. The actuating mechanism 54 includes a handle 60 attached on a circular disc 62 rotatably mounted in an opening 64A of a bracket plate 64 which is fixed on and extends outwardly from the base frame 30. The actuating mechanism 54 also includes a cam element 66 secured in the circular disc 62 and extending upwardly through a slot 68 formed in a tab 70 which is fixed on and extends outwardly from the pellet rolling plate 52 above the bracket plate 64.

As seen in FIG. 16, when the handle 60 is rotated clockwise from its solid line position to dashed line position, the pellet rolling plate 52 is moved linearly from the inwardly-displaced solid line position to outwardly-displaced dashed line position. Rotation of the handle 60 counterclockwise produced movement of the plate 52 in the opposite direction. The total movement of the pellets P is preferably at least approximately on full revolution of the pellet circumference.

Referring to FIGS. 1 and 18, there is illustrated the swivel mechanism 28 having a universal ball joint 72 and a handle 74 movable between locking and unlocking positions. As mentioned above, the swivel mechanism 28 supports the pellet turner deck 26 and, in turn, once the handle 74 has been moved to the unlocking position of FIG. 18 is operable for swiveling and tilting the pellet turner deck 26 to simultaneously place the pellets in a tilted or inclined position. When the deck 26 and pellets P have been placed in the desired tilted position, the handle 74 is moved back to the locked position shown in FIG. 1. The above-described actuating mechanism 54 can be operated to oscillate the plate 52 to cause rolling or turning of the tilted pellets in situ. This permits an operator to easily visually inspect the entire perimeters of the end edges of the pellets for the presence of cracks and chips. After one end of the pellets are inspected, the swivel mechanism 28 is operated to rotate the pellet turner deck 26 through 180° and reverse the tilting of the deck 26 to inspect the opposite end edges of the pellets.

Referring now to FIGS. 19-25, there is illustrated the interface assembly 24 mounted on the right loading end 22A of the pellet turner deck 26 of the pellet turner assembly 22. The interface assembly 24 basically includes a tray elevating mechanism 76 and an actuating cam mechanism 78 operable to cause raising and lowering of the elevating mechanism 76. The tray elevating mechanism includes a plurality of engaging elements 80 mounted for reciprocal vertical movement on the exterior side of the support bar 36. Each engaging element 80 includes a plate 82 having a pair of vertical slots 84 which receive studs 86 extending from the support bar 36 to mount the plate 82 for vertical reciprocal movement. Each engaging element 80 further has an upstanding pin 88 insertable into a hole 90 (FIGS. 2 and 23) in the transfer end 20A of the pellet supply tray 20.

The actuating cam mechanism 78 includes a handle 92 and a plurality of links 94 extending from the handle 92 and between and coupled with the engaging elements 80 of the tray elevating mechanism 76 via cam pins 96 on the links 94 extending through inclined slots 98 in the plates 82. The handle 92 is attached to a plate 100 which, in turn, is pivotally mounted to the base frame 30 by a stud 102. The pivotal movement of the plate 100 produced by pivotal movement of the handle 92 is transmitted and converted to linear movement of the interconnected links 94 via a cam pin 104 which is attached to the leftmost one of the links 94 and extends through an arcuate slot 106 formed through the plate 100. The offset of the radius of the arcuate slot 106 from the pivot point of the plate 100 produces linear movement of the links 94 upon rotation of the plate 100 and handle 92.

In such manner, the actuating cam mechanism 78 is coupled to the tray elevating mechanism 76 and operable for moving the elevating mechanism to position the pellet transfer end of the supply tray either above or below the loading end 22A of the pellet turner assembly 22 depending upon the direction of rotation of the handle 92. Positioning of the pellet transfer end 20 A of the pellet supply tray 20 above or below the loading end 22A of the pellet turner assembly 22 correspondingly facilitates transferring of pellets to or from the pellet turner assembly 22.

Referring to FIGS. 26-28, there is illustrated a pellet rake 108 which can be employed by an operator with the pellet turning apparatus 10 to slidably move pellets onto and from the deck 26. The rack 108 has a handle 110 at one end, a row of teeth 112 spaced apart by a distance adapting them to fit within the channels 34 of the deck 26, and interconnected by a flat connecting portion 114. The teeth 112 extend at a right angle to the flat portion 114.

Figure 19:
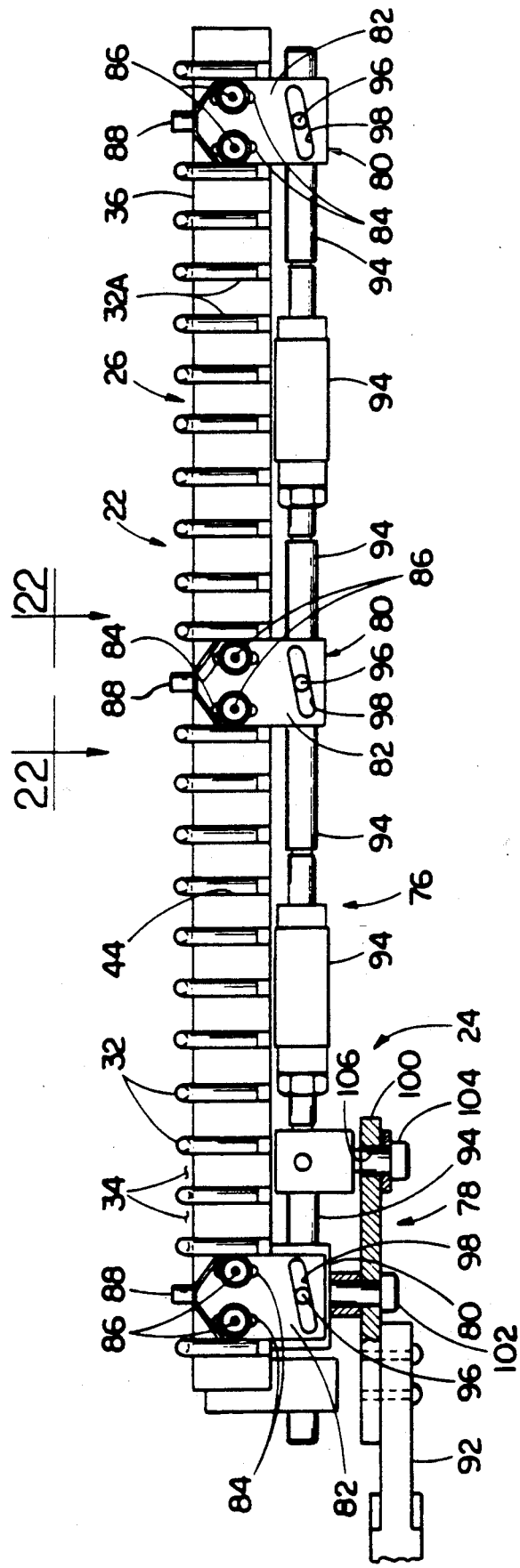
FIG. 19 is an enlarged end elevational view of an interface assembly of the pellet turning apparatus as seen along line 19—19 of FIG. 4.
Figure 24:
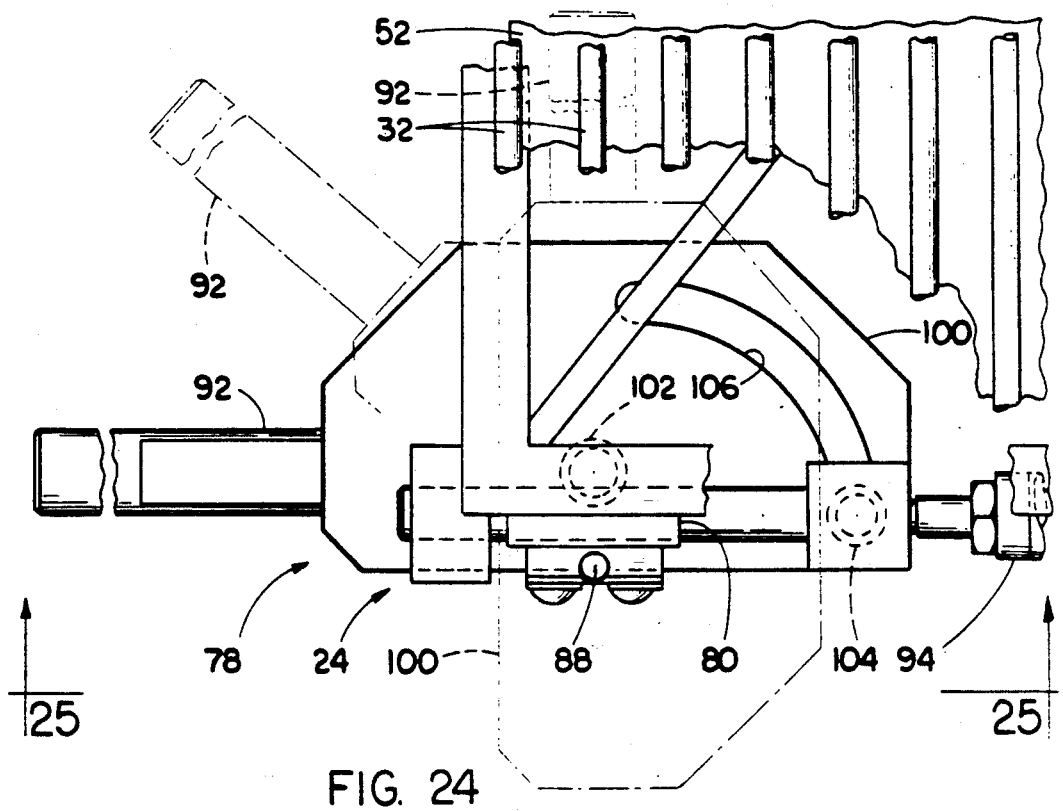
FIG. 24 is an enlarged top plan view of the interface assembly of FIG. 19 illustrating an actuating cam mechanism of the interface assembly coupled to the tray elevating mechanism thereof.
Figure 25:
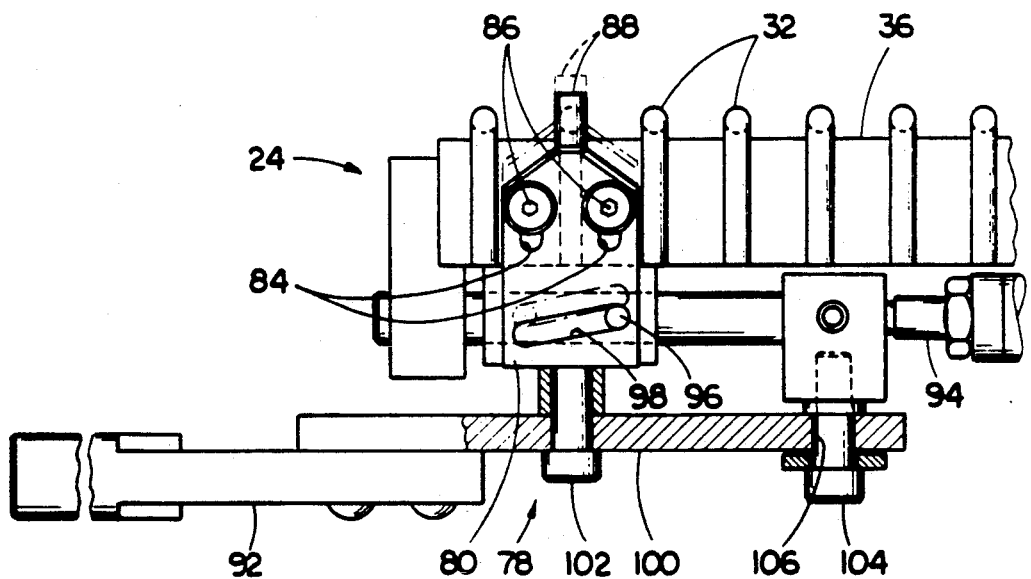
FIG. 25 is an end elevational view, partly in section, of the actuating cam mechanism as seen along line 25—25 of FIG. 24.
Figure 29:
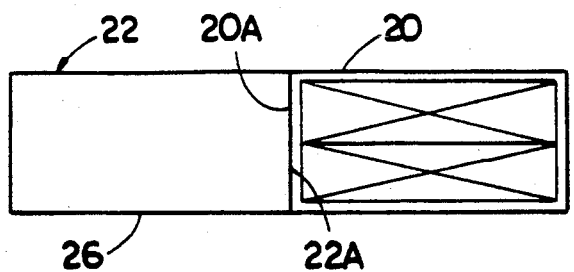
FIGS. 29 to 34 are diagrammatic views of the operations involved in using the pellet turning apparatus of the present invention for inspecting the entire cylindrical surfaces of the pellets for dimensional quality, longitudinal cracks and chipped edges.
Figure 30:
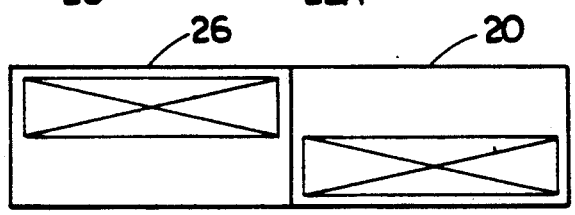
Figure 31:
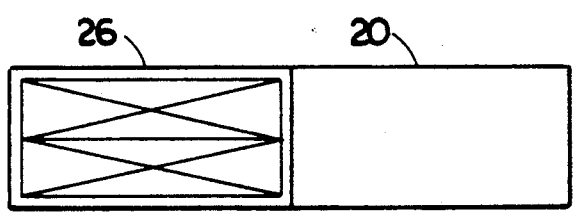
Figure 32:
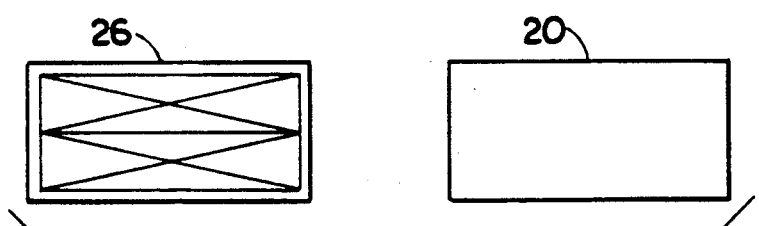

Referring to FIGS. 29 to 34, there are diagrammatic views of the operations involved in using the pellet turning apparatus 10 of the present invention for inspecting the entire cylindrical surfaces of the pellets (P) for dimensional quality, longitudinal cracks and chipped edges. FIG. 29 shows a pellet supply tray 20 disposed adjacent the pellet turner deck 26 of the turner assembly 22. The deck 26 is locked in stationary position and the transfer end 20A of the tray 20 is coupled to the interface assembly 24 (FIG. 19). The interface assembly 24 is operated to elevate the transfer end 20A of the tray 20 slightly above the loading end 22A of the deck 26. The two rectangles with diagonal lines represent multiple adjacent rows of pellets supported on the supply tray 20. Using the rake 108 (FIG. 26), an operator sweeps a first group of pellets from the supply tray onto the deck 26 to the position shown in FIG. 30 and then sweeps a second group of pellets onto the deck 26 to the position shown in FIG. 31. In order to provide clearance for swiveling and tilting the deck 26, as seen in FIG. 32 the emptied tray 20 is shifted to a position away from the deck 26.

Figure 33:
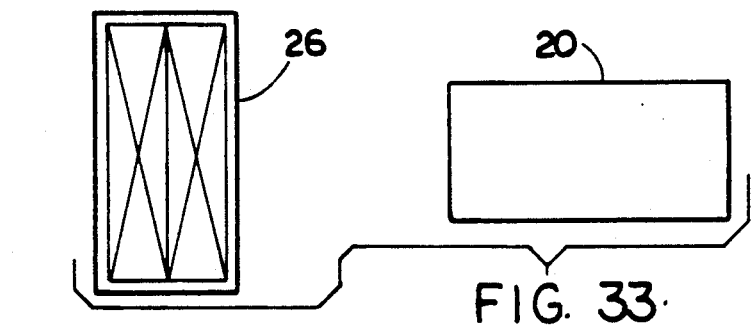
Figure 34:
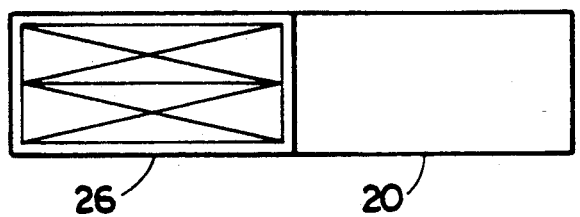

Next, as represented by FIG. 33, visual inspection commences with the operator moving the plate 52 (FIG. 15) to turn the pellets a full revolution for cylindrical surface inspection. The turning is accomplished by the operator manually swinging the handle 60 of the actuating mechanism 54 (FIG. 16) coupled to the plate 52 through 180°. Then, edge chip visual is performed by the operator utilizing the swivel mechanism 28 to tilt the deck 26 and by again manually swinging the handle 60 to oscillate the plate 52 and turn the pellets. Makeup pellets are inserted by the operator to replace rejected pellets removed by the operator. Finally, the deck 26 is repositioned to its original orientation and the supply tray 20 is returned to the interfaced relationship with the deck as shown in FIG. 34. However, this time the interface assembly 24 is operated to lower the transfer end 20A of the supply tray 20 slightly below the load end 22A of the deck to facilitate transfer of the inspected pellets from the deck 26 to the supply tray 20. The rake 108 is again used by the operator to sweep the groups of inspected pellets from the deck 26 back onto the supply tray 20.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A pellet turning apparatus for facilitating surface inspection of nuclear fuel pellets, comprising:
    (a) a pellet turner assembly capable of supporting a plurality of pellets and having a pellet loading end, said pellet turner assembly being operable for producing simultaneous turning of the pellets in situ to permit visual inspection of the entire circumferential surfaces thereof; and
    (b) an interface assembly coupled to said pellet turner assembly and being operable for positioning a pellet transfer end of a pellet supply tray relative to said loading end of said pellet turner assembly to facilitate transfer of uninspected pellets from the pellet supply tray to said pellet turner assembly and of inspected pellets from said pellet turner assembly to the pellet supply tray;
    (c) said pellet turner assembly including
        (i) a plurality of elongated laterally-spaced members defining channels for receiving the pellets in rows thereof between said members,
        (ii) a pellet rolling plate movably supported below said pellet channel-defining members for supporting pellets between said pellet channel-defining members, and
        (iii) an actuating mechanism coupled to said pellet rolling plate and being operable to cause oscillatory movement of said plate relative to said channel-defining members for producing turning of the pellets in situ within said channels.

2. The apparatus as recited in claim 1, further comprising:
    a rake engageable with the pellets and for use by an operator to transfer pellets between the pellet supply tray and said pellet turner assembly.

3. The apparatus as recited in claim 1, wherein said interface assembly is operable for disposing said pellet transfer end of the pellet supply tray at a desired elevation above or below said pellet loading end of said pellet turner assembly.

4. The apparatus as recited in claim 3, wherein said interface assembly includes:
    a tray elevating mechanism mounted to said pellet loading end of said pellet turner assembly for engaging the transfer end of the pellet supply tray; and an actuating cam mechanism coupled to said pellet elevating mechanism and being operable for moving said elevating mechanism to position the pellet transfer end of the supply tray above or below the loading end of said pellet turner assembly.

5. The apparatus as recited in claim 4, wherein said tray elevating mechanism includes a plurality of engaging elements capable of coupling with the pellet transfer end of the pellet supply tray, said actuating cam mechanism being operable for raising or lowering of said engaging elements upon movement of said elevating mechanism and thereby to raise or lower the pellet transfer end of the supply tray respectively above or below said loading end of said pellet turner assembly to facilitate transferring of pellets between said pellet turner assembly and the pellet supply tray.

6. The apparatus as recited in claim 1, wherein said pellet turner assembly includes:
   a pellet turner deck; and
   a swivel mechanism supporting said pellet turner deck.

7. The apparatus as recited in claim 6, wherein said pellet turner deck includes:
   a base frame mounted on said swivel mechanism;
   a plurality of elongated laterally-spaced members extending between opposite ends of said base frame and defining channels for receiving the pellets in rows thereof between said members; and
   means for supporting said elongated channel-defining members at their opposite ends in spaced relation above said base frame.

8. The apparatus as recited in claim 7, wherein said pellet turner deck further includes:
   a pellet rolling plate supported on said base frame below said pellet channel-defining members for supporting pellets between said pellet channel-defining members; and
   an actuating mechanism coupled to said pellet rolling plate and being operable to cause oscillatory movement of said plate relative to said channel-defining members for producing turning of the pellets in situ within said channels.

9. The apparatus as recited in claim 6, wherein:
   said loading end of said pellet turner assembly is defined at one end of said pellet turner deck; and
   said interface assembly is mounted at said one end of said pellet turner deck.

10. The apparatus as recited in claim 9, wherein said interface assembly is operable for disposing said pellet transfer end of the pellet supply tray at a desired elevation above or below said one end of said pellet turner deck.

11. The apparatus as recited in claim 10, wherein said interface assembly includes:
   a tray elevating mechanism mounted to said one end of said pellet turner deck for engaging the transfer end of the pellet supply tray; and
   an actuating cam mechanism coupled to said pellet elevating mechanism and being operable for moving said elevating mechanism to position the pellet transfer end of the supply tray above or below the loading end of said pellet turner assembly.

12. The apparatus as recited in claim 11, wherein said tray elevating mechanism includes a plurality of engaging elements capable of coupling with the pellet transfer end of the pellet supply tray, said actuating cam mechanism being operable for raising or lowering of said engaging elements upon movement of said elevating mechanism and thereby to raise or lower the pellet transfer end of the supply tray respectively above or below said loading end of said pellet turner assembly to facilitate transferring of pellets between said pellet turner assembly and the pellet supply tray.

13. A pellet turning apparatus for facilitating surface inspection of nuclear fuel pellets, comprising:
   (a) a pellet turner assembly capable of supporting a plurality of pellets and having a pellet loading end, said pellet turner assembly being operable for producing simultaneous turning of the pellets in situ to permit visual inspection of the entire circumferential surfaces thereof, said pellet turner assembly being further operable for placing the pellets simultaneously in a tilted position to permit visual inspection of opposite edges thereof; and
   (b) an interface assembly coupled to said pellet turner assembly and being operable for disposing a pellet transfer end of a pellet supply tray at a desired elevation above or below said loading end of said pellet turner assembly to facilitate transfer of uninspected pellets from the pellet supply tray to said pellet turner assembly and of inspected pellets from said pellet turner assembly to the pellet supply tray;
   (c) said pellet turner assembly including
      (i) a plurality of elongated laterally-spaced members defining channels for receiving the pellets in rows thereof between said members,
      (ii) a pellet rolling plate movably supported below said pellet channel-defining members for supporting pellets between said pellet channel-defining members, and
      (iii) an actuating mechanism coupled to said pellet rolling plate and being operable to cause oscillatory movement of said plate relative to said channel-defining members for producing turning of the pellets in situ within said channels.

14. The apparatus as recited in claim 13, wherein said pellet turner assembly includes:
   a pellet turner deck for supporting pellets in side-by-side spaced rows; and
   a swivel mechanism supporting said pellet turner deck and being operable for tilting said pellet turner deck to produce simultaneous tilting of the pellets to permit visual inspection of opposite edges thereof.

15. The apparatus as recited in claim 14, wherein said pellet turner deck includes:
   a base frame mounted on said swivel mechanism;
   a plurality of elongated laterally-spaced members extending between opposite ends of said base frame and defining channels for receiving and arranging the pellets in rows thereof between said members; and
   means for supporting said elongated channel-defining members at their opposite ends in spaced relation above said base frame.

16. The apparatus as recited in claim 15, wherein said pellet turner deck further includes:
   a pellet rolling plate supported on said base frame below said pellet channel-defining members for supporting pellets between said pellet channel%defining members; and
   an actuating mechanism coupled to said pellet rolling plate and being operable to cause oscillatory movement of said plate relative to said channel-defining members for producing turning of the pellets in situ within said channels.

17. The apparatus as recited in claim 14, wherein:
said loading end of said pellet turner assembly is defined at one end of said pellet turner deck; and
said interface assembly is mounted at said one end of said pellet turner deck.

18. The apparatus as recited in claim 17, wherein said interface assembly is operable for disposing said pellet transfer end of the pellet supply tray at a desired elevation above or below said one end of said pellet turner deck.

19. The apparatus as recited in claim 18, wherein said interface assembly includes:
a tray elevating mechanism mounted to said one end of said pellet turner deck for engaging the transfer end of the pellet supply tray; and
an actuating cam mechanism coupled to said pellet elevating mechanism and being operable for moving said elevating mechanism to position the pellet transfer end of the supply tray above or below the loading end of said pellet turner assembly.

20. The apparatus as recited in claim 19, wherein said tray elevating mechanism includes a plurality of engaging elements capable of coupling with the pellet transfer end of the pellet supply tray, said actuating cam mechanism being operable for raising or lowering of said engaging elements upon movement of said elevating mechanism and thereby to raise or lower the pellet transfer end of the supply tray respectively above or below said loading end of said pellet turner assembly to facilitate transferring of pellets between said pellet turner assembly and the pellet supply tray.

21. A pellet turning apparatus for facilitating surface inspection of nuclear fuel pellets, comprising:
(a) a pellet turner assembly capable of supporting a plurality of pellets and having a pellet loading end, said pellet turner assembly being operable for producing simultaneous turning of the pellets in situ to permit visual inspection of the entire circumferential surfaces thereof; and
(b) an interface assembly coupled to said pellet turner assembly and being operable for positioning a pellet transfer end of a pellet supply tray relative to said loading end of said pellet turner assembly to facilitate transfer of uninspected pellets from the pellet supply tray to said pellet turner assembly and of inspected pellets from said pellet turner assembly to the pellet supply tray;
(c) said pellet turner assembly including
  (i) a pellet turner deck for supporting the pellets, and
  (ii) a swivel mechanism supporting said pellet turner deck.

22. A pellet turning apparatus for facilitating surface inspection of nuclear fuel pellets, comprising:
(a) a pellet turner assembly capable of supporting a plurality of pellets and having a pellet loading end, said pellet turner assembly being operable for producing simultaneous turning of the pellets in situ to permit visual inspection of the entire circumferential surfaces thereof, said pellet turner assembly being further operable for placing the pellets simultaneously in a tilted position to permit visual inspection of opposite edges thereof; and
(b) an interface assembly coupled to said pellet turner assembly and being operable for disposing a pellet transfer end of a pellet supply tray at a desired elevation above or below said loading end of said pellet turner assembly to facilitate transfer of uninspected pellets from the pellet supply tray to said pellet turner assembly and of inspected pellets from said pellet turner assembly to the pellet supply tray;
(c) said pellet turner assembly including
  (i) a pellet turner deck for supporting the pellets in side-by-side spaced rows, and
  (ii) a swivel mechanism supporting said pellet turner deck and being operable for tilting said pellet turner deck to produce simultaneous tilting of the pellets to permit visual inspection of opposite edges thereof.

* * * * *